United States Patent
Brehmer et al.

(10) Patent No.: US 9,250,973 B2
(45) Date of Patent: Feb. 2, 2016

(54) APPARATUS AND ASSOCIATED METHODOLOGY OF GENERATING A MULTI-CORE COMMUNICATIONS TOPOLOGY

(75) Inventors: Sven Brehmer, Foster City, CA (US); Tamer Abuelata, Cupertino, CA (US); Iulian Stoica, Rotselaar (BE)

(73) Assignee: POLYCORE SOFTWARE, INC., Burlingame, CA (US)

(*) Notice: Subject to any disclaimer, the term of this patent is extended or adjusted under 35 U.S.C. 154(b) by 613 days.

(21) Appl. No.: 12/403,144

(22) Filed: Mar. 12, 2009

(65) Prior Publication Data
US 2010/0235847 A1    Sep. 16, 2010

(51) Int. Cl.
*G06F 9/46* (2006.01)
*G06F 3/048* (2013.01)
*G06F 9/50* (2006.01)

(52) U.S. Cl.
CPC .................................. *G06F 9/5066* (2013.01)

(58) Field of Classification Search
None
See application file for complete search history.

(56) References Cited

U.S. PATENT DOCUMENTS

| | | | |
|---|---|---|---|
| 7,039,718 B2 | 5/2006 | Vertes | |
| 7,146,607 B2 | 12/2006 | Nair et al. | |
| 7,162,709 B2 | 1/2007 | Reyna et al. | |
| 7,181,141 B1 | 2/2007 | Kapur et al. | |
| 2002/0138659 A1* | 9/2002 | Trabaris et al. | 709/313 |
| 2003/0046641 A1* | 3/2003 | Fennell et al. | 716/1 |
| 2004/0226026 A1 | 11/2004 | Glass et al. | |
| 2005/0114565 A1* | 5/2005 | Gonzalez et al. | 710/36 |
| 2005/0125629 A1* | 6/2005 | Kissell | 712/1 |
| 2005/0183097 A1 | 8/2005 | Carter et al. | |

(Continued)

FOREIGN PATENT DOCUMENTS

| | | |
|---|---|---|
| JP | 2-214964 A | 8/1990 |
| JP | 3-80337 A | 4/1991 |

(Continued)

OTHER PUBLICATIONS

Shay Gal-On, et al., "Measuring Multicore Performance", Embedded Computing, Nov. 2008, [retrieved on Apr. 30, 2010] Retrieved from the Internet: <URL: http://www.eng.auburn.edu/~vagrawal/COURSE/E6200_Fall08/READ/Measuring_Multicore_Performance.pdf> pp. 99-102.

(Continued)

*Primary Examiner* — Umut Onat
(74) *Attorney, Agent, or Firm* — Oblon, McClelland, Maier & Neustadt, L.L.P.

(57) ABSTRACT

An apparatus and associated method of generating a multi-core communication topology. The topology corresponding to a predetermined number of cores of a multi-core computer, is generated with an application programming device. A number of nodes are described for mapping to the predetermined number of available cores of the multi-core communication topology. Properties of each of the number of nodes are specified. Communication between each of the nodes of the multi-core communication topology is specified using a dedicated multi-core communication library of an electronic memory of the application programming device. A validated output file is generated for the multi-core topology at the application programming device. The output file to is processed to generate a multi-core communication capable executable application program interface (API) for the multi-core computer.

22 Claims, 12 Drawing Sheets

(56) References Cited

U.S. PATENT DOCUMENTS

| | | | |
|---|---|---|---|
| 2007/0016683 | A1 | 1/2007 | Mathews et al. |
| 2007/0061731 | A1 | 3/2007 | Dillon et al. |
| 2007/0220294 | A1 | 9/2007 | Lippett |
| 2007/0282572 | A1* | 12/2007 | Larus ............... 703/2 |
| 2007/0294074 | A1* | 12/2007 | Ciolfi ............... 703/21 |
| 2008/0002702 | A1 | 1/2008 | Bajic et al. |
| 2008/0077605 | A1* | 3/2008 | Vasu ............... 707/101 |
| 2008/0104615 | A1 | 5/2008 | Nolan et al. |
| 2008/0181245 | A1 | 7/2008 | Basso et al. |
| 2008/0307082 | A1* | 12/2008 | Cai et al. ............... 709/223 |
| 2009/0031325 | A1 | 1/2009 | Archer et al. |
| 2009/0234826 | A1* | 9/2009 | Bidlack ............... 707/5 |

FOREIGN PATENT DOCUMENTS

| | | |
|---|---|---|
| JP | 2002-116916 A | 4/2002 |
| JP | 2007-48052 A | 2/2007 |
| JP | 2007-80049 A | 3/2007 |
| JP | 2007-264734 A | 10/2007 |
| JP | 2008-250838 A | 10/2008 |
| WO | WO 2007/037006 A1 | 4/2007 |
| WO | WO 2008/108133 A1 | 9/2008 |

OTHER PUBLICATIONS

European Patent Office Communication issued in related European Application No. 10751388.9 on Oct. 30, 2012.

European Patent Office Communication issued in related Euroepan Application No. 10751388.9 on Oct. 11, 2012.

Office Action issued Oct. 25, 2013 in European Patent Application No. 10 751 388.9.

Combined Chinese Office Action and Search Report issued Aug. 22, 2013 in Patent Application No. 201080011604.6 with English Translation.

Office Action issued Mar. 10, 2014 in Japanese Patent Application No. 2011-554170 with English language translation.

New Products: LabVIEW 8.5, Interface, Japan CQ Publishing KK, 33$^{rd}$ Volume, No. 10 (Total364 Volumes), Oct. 2007, p. 45.

Office Action issued Jun. 23, 2014, in Chinese Patent Application No. 201080011604.6 (with English-language Translation).

Office Action mailed Dec. 15, 2014 in Japanese Patent Application No. 2011-554170 (with English-language Translation).

Office Action issued Jun. 26, 2015 in Chinese Patent Application No. 201080011604.6.

* cited by examiner

```
function.pipeline_post_proc.c    poly_module.3    PTProj_1_3.topo
static PolyDispatcher *gaDispatchers[POLY_SUBNET_NO] =
{
    (PolyDispatcher *)>NET1,
    (PolyDispatcher *)>NET2,
    (PolyDispatcher *)>NET3
};

static WINSMTxLinkDriver gaPolyOutPort_NET1_NODE4_LINK0;
static PolyFifoQueue gaPolyOutPortQueues_NET1_NODE4_LINK0[POLY_PRIORITY_NO];
static WINSMTxLinkDriverParam gaPolyOutPortParams_NET1_NODE4_LINK0 =
{
    "N1_TO_N4", 0, 256, 0, 0
};
static WINSMRxLinkDriver gaPolyInPort_NET1_NODE4_LINK0;
static WINSMRxLinkDriverParam gaPolyInPortParams_NET1_NODE4_LINK0 =
{
    "N4_TO_N1", 0, 256, 0, 1
};

static PolyOutPort *gaPolyOutPorts_NET1_NODE4[POLYOUTPORTS_NET1_NODE4] =
{
    (PolyOutPort *)&gaPolyOutPort_NET1_NODE4_LINK0
};
```

FIG 12

APPARATUS AND ASSOCIATED METHODOLOGY OF GENERATING A MULTI-CORE COMMUNICATIONS TOPOLOGY

BACKGROUND OF THE INVENTIVE FIELD

The presently described advancements relate to a multi-core processor interface function and topology, and, more particularly, to a multi-core processor interface leveraging a generated topology for providing decreased energy utilization and increased operational speed, and associated methodology.

The "background" description provided herein is for the purpose of generally presenting the context of the inventive field. Work of the presently named inventors, to the extent described in this section, as well as aspects of the background description which may not otherwise qualify as prior art at the time of filing, are neither expressly or impliedly admitted as prior art, but instead, provided in the spirit of teaching the overall context of the advancements claimed herein.

As software increases in complexity and resource consumption, a corresponding demand on hardware platforms is created. In answering this demand, single-core processors and the performance imperative of Moore's Law, have limited the ability to keep pace by corresponding increases in processing power (i.e., via increasing clock speeds). To overcome this problem, multi-processor architectures have been developed such that two or more processors are utilized on a same board to achieve performance gains. These multi-processor architectures are known as "multi-core". Multi-core processors increase processing performance while reducing processor footprints and providing better power consumption and thermal characteristics.

Yet, most legacy application software is written for a single processor. Such application software will not automatically run faster on an embedded multi-core computer; in fact it may not run at all. This may be the case even if the software is multi-threaded, as in a single processor the threads will run sequentially whereas in a multi-core computer they may run concurrently, exposing synchronization problems not discovered in the single processor case. Programming multi-threaded code often requires complex coordination of threads and can easily introduce bugs that are difficult to find due to the interleaving of processing on data shared between threads. To further complicate matters, the threads are ideally distributed among the multiple cores in a manner that loads the cores equally, to achieve maximum benefit (performance and power consumption).

Given the increasing emphasis on multi-core chip design, the extent to which software can be multithreaded to take advantage of these new chips is likely to be the single greatest constraint on computer performance in the foreseeable future.

Presently, there is a need for a portable API, devoid of the aforementioned deficiencies, providing an optimized communications topology for multi-core processor applications.

SUMMARY OF EXEMPLARY ASPECTS OF THE INVENTIONS

In one aspect of the inventions, an apparatus and associated method of generating a multi-core communication topology are provided. The topology corresponds to a predetermined number of cores of a multi-core computer, generated with an application programming device. A number of nodes are described for mapping to the predetermined number of available cores of the multi-core communication topology. Properties of each of the number of nodes are specified. Communication between each of the nodes of the multi-core communication topology is specified using a dedicated multi-core communication library of an electronic memory of the application programming device, combined with the application. A validated output file is generated for the multi-core topology at the application programming device. The output file is processed to generate a multi-core communication capable executable application program interface (API) for the multi-core computer.

It is to be understood that both the foregoing general description of the invention and the following detailed description are exemplary, but are not restrictive, of the invention.

BRIEF DESCRIPTION OF THE SEVERAL VIEWS OF THE DRAWINGS

A more complete appreciation of the advancements claimed herein and many of the attendant advantages thereof will be readily obtained as the same becomes better understood by reference to the following detailed description when considered in connection with the accompanying drawings. However, the accompanying drawings and their exemplary depictions do not in any way limit the scope of the advancements embraced by this specification. The scope of the advancements embraced by the specification and drawings are defined by the words of the accompanying claims.

DETAILED DESCRIPTION

The advancements in the art described herein employ a "Multi-core Communications Topology Generator" (MCTG) to generate, as the name implies, a multi-core communication topology having a predefined number of nodes to be distributed onto the cores of a multi-core processor computer using an Extensible Markup Language, for example, (XML).

Certain terminology used in the following description is for convenience only and is not limiting. The term "multi-core processor computer" is used herein to refer to a computer running two or more independent cores integrated into a single silicon die, or having two or more cores assembled in an integrated package, or on one or more printed circuit boards (PCB's). Exemplary multi-core processor computers commercially available include the PowerPC® and Cell Processor from IBM of Armonk, N.Y., Xeon® from Intel of Santa Clara, Calif., and the OMAP® from Texas Instruments of Dallas, Tex. Likewise, a "core" is used herein to refer to a central part of a microprocessor, which may be a CPU (central processing unit), a DSP (Digital Signal Processor), GPU (Graphics Processing Unit), or other special purpose processor. A "node" is used herein to refer to an object that is attached to a network, and is capable of sending, receiving, or forwarding information over a communications channel and it is a logical abstraction that can be mapped to many entities, including but not limited to: a process, a thread, an instance of an operating system, a hardware accelerator, or a processor core.

There are two distinct types of multi-core processors, general-purpose and application-focused multi-core processors.

General-purpose multi-core processors are processors with multiple, usually homogeneous, cores, in which any of the cores may be used to provide the processing needs within an application. In contrast, application focused multi-core processors provide different cores for different pieces of an application. For example, one core may process audio/video while the other manages input/output devices.

The amount of performance gained by the use of a multi-core processor depends on the problem being solved and the algorithms used, as well as their implementation in software and the hardware architecture. Application software benefits from multi-core architectures when code can be executed in parallel.

Figure 1:
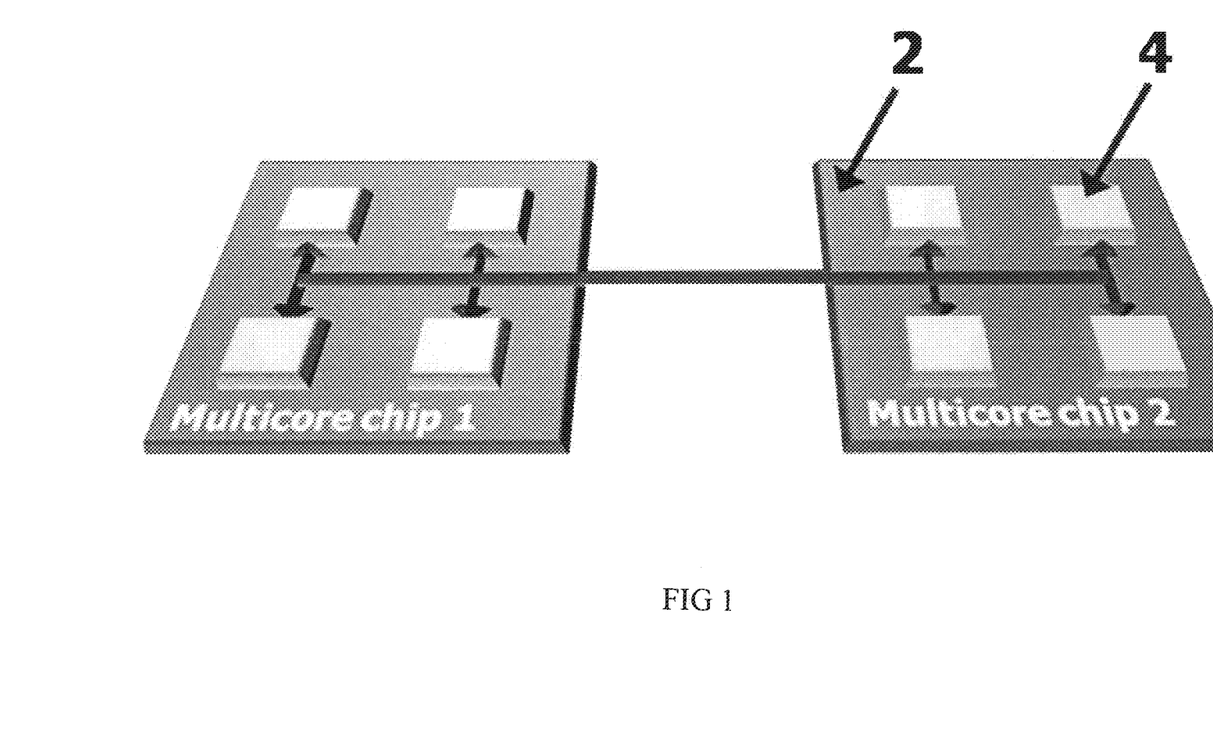
FIG. 1 is a high level block diagram of a typical multi-core processor architecture in accordance with an exemplary embodiment of the present inventions.

Referring now to FIG. 1, an embedded multi-core processor computer 2 is a special-purpose computer system comprised of multiple processor cores 4 designed to perform one or a few dedicated functions, often with real-time computing constraints. In FIG. 1, two four core processors are shown. The multi-core processor is typically embedded as part of a complete device including associated hardware and mechanical parts. The multiple cores may be on one single chip or on multiple chips, or both. The computer has a static topology which means that the same number of cores are physically present when the system is powered up (as opposed to a dynamic topology with changing number of processors, e.g. the Internet.)

Typically, the Multi-core Communications API from the Multi-core Association (MCAPI) provides a standardized API for communication and synchronization between closely distributed cores and/or processors in multi-core computer systems. The purpose of MCAPI is to capture the basic elements of communication and synchronization that are required for closely distributed embedded systems. The target systems for such an API span multiple dimensions of heterogeneity (e.g., core heterogeneity, interconnect heterogeneity, memory heterogeneity, operating system heterogeneity, software tool chain heterogeneity, and programming language heterogeneity).

The MCAPI standard aims to be implemented on both process-oriented and thread-oriented systems. MCAPI defines a transport layer between 'nodes', which could be processes, threads, or some other thread-of-control abstraction. The standard explicitly avoids having any dependence on a particular shared memory model or process protection model. The communication operations defined by MCAPI are ideally implemented with identical semantics on either thread- or process-based systems. Thus, programs that use only the MCAPI constructs should be portable between MCAPI implementations. On the other hand, programs that make use of APIs outside of MCAPI, for example pthreads, will only be portable between systems that include those extra APIs.

Figure 2:
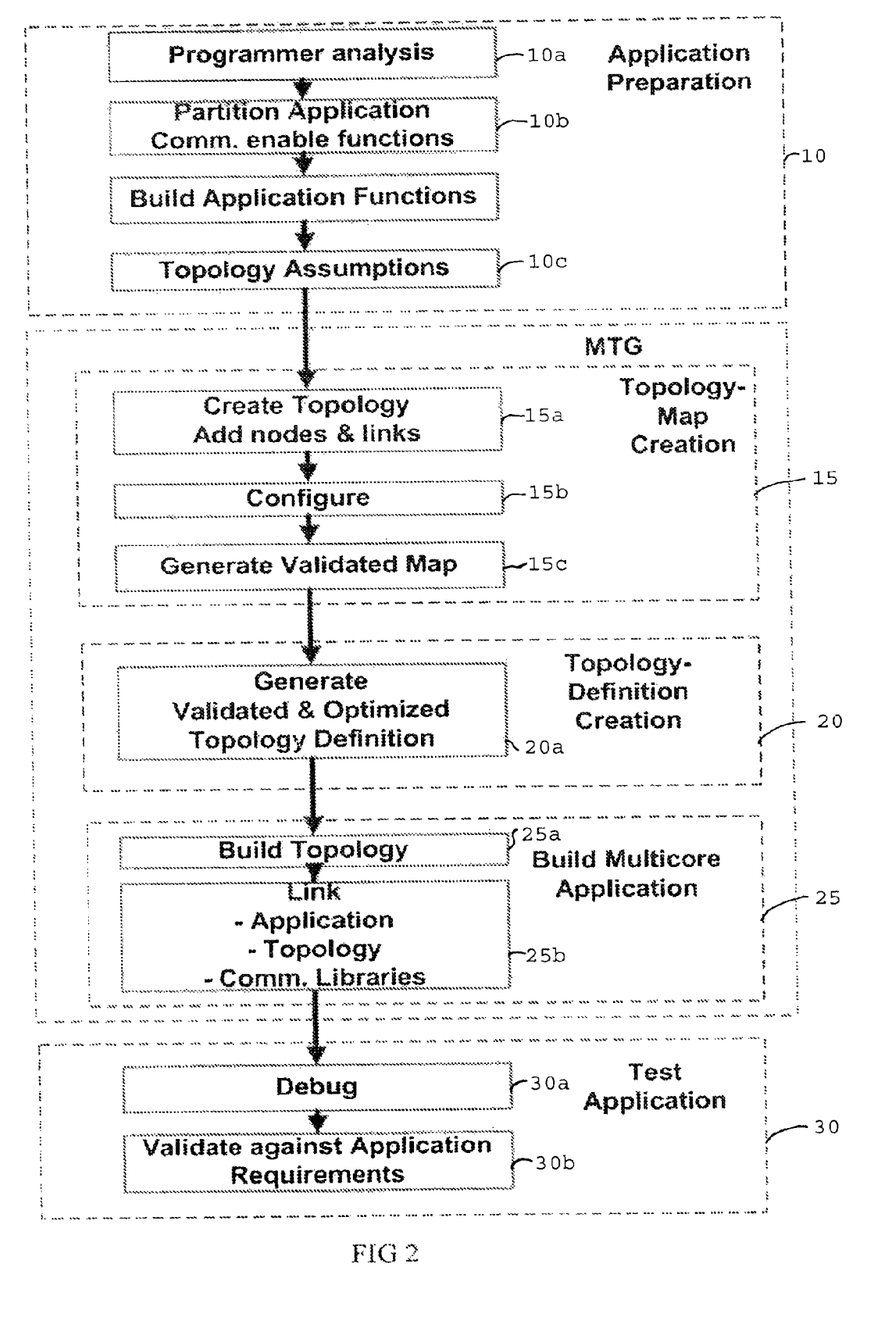
FIG. 2 is a process flow diagram of the modular architecture of the muticore topology generator of an exemplary embodiment of the present inventions.

As shown in FIG. 2, the modular architecture of the MCTG of the exemplary embodiment is divided into modules, namely Application Preparation 10, Topology-Map Creation 15, Topology Definition Creation 20, Build Multicore Application 25 and Test Application 30. This modular architecture makes it simpler to add and remove specific functionality to accommodate different system requirements while keeping the footprint as small as possible. By separating the topology configuration and the run-time communication application modules can be re-mapped to different cores 4 at configuration time, and the topology resources and configuration can be modified and optimized, without modification of the application source code. Those skilled in the art will recognize that the modular software can be separated or integrated to one system package or combination thereof.

A developing platform will execute the process flow of the MCTG of FIG. 2 as a utility application executing in conjunction with a general purpose processor and operating systems such as Microsoft VISTA®, Unix, Solaris, Linux, Apple MAC-OS and other systems known to those skilled in the art. In the exemplary embodiment, a developer station includes a GUI.

In use, the application programmer determines the number of desired nodes for input to the MCTG. The determination is based on concurrent execution opportunities and assumes mapping of the nodes to cores 2, based on analysis of the functional modules in the application program and the hardware architecture. The nodes are created, configured, linked and mapped (bound) to cores 2, comprising the communications topology. The tools assisted topology creation is done graphically, structured and scalable using XML based models, using runtime library components specific to the target embedded multi-core processor computer as described further herein. This method provides a separation of the application functions and the underlying topology, simplifying the application programming process.

Referring now more specifically to FIG. 2, five separate blocks depict the flow of application configuration operations including how the multicore communications topology is built in the exemplary embodiment, configured, and validated. The application topology and runtime communication library are mapped onto multicore computer hardware such as shown in FIG. 1.

At block 10, Application Preparation, a programmer with knowledge with respect to the application program to be modified, configured and combined with the optimized and validated multicore topology to run on the multicore hardware, inspects, analyses, modifies and configures the software at the developer station.

The analysis determines potential for parallelism and concurrency, and includes but is not limited to, the modularity of the application functions, data dependencies between different functions which involves finding data structures shared between the different functions and whether they may cause race conditions that could cause data destruction or program deadlocks, as well as specific performance requirements regarding response times, throughput and power consumption. Profiling is used to find the most compute intensive functions of the application, either with a profiling tool or by using a simulator that provides similar functionality. The programmer partitions the application into functional modules and communication enables the modules (communication primitives inserted). The application functional modules are build using standard development tools into object files. Based on the application analysis, the application partitioning and the target multicore computer, the programmer estimates how to best map the application and to create and configure the communications topology, balancing performance and resource requirements.

At block 15, Topology Map Creation, the topology is created and nodes as well as links are added and configured. Node and link resources as well as their binding to the multicore computer are configured as shown in a step by step procedure. Once the topology is completed it is validated and saved and the XML-based Topology-Map is generated. The XML topology map can also be viewed directly in XML view. The XML topology map can be edited via a text editor or processed by other applications.

At block 20, Topology Definition Creation, the topology-map is parsed, validated, shortest path between nodes calculated, and documented in static routing tables. The topology definition, including definitions, routing tables, pre-allocated data structures and predefined initialization routines, is created using the developer station. Because the communications topology is static, model based, and predefined it can be validated.

At block 25, Build Multicore Application, the topology definition is built using standard development tools such as a compiler and an assembler. In the exemplary embodiment the generated topology is structured into an application based on the C programming language, however, those skilled in the art will recognize that other object oriented constructs are embraced by the scope of this description. In this way, the topology is now linked with the previously built application and the communications run-time library.

At block 30, Test Applications, the generated application is debugged for correctness and performance, using standard debugging tools. The application is validated against application requirements, functionality, performance. Important requirements could be application program speed and power consumption.

The blocks of FIG. 2 constitute an illustrative embodiment only, showing a single pass description, of course those skilled in the art will recognize that alternative embodiments, such as iterative embodiments are also embraced by this configuration. Such iterative embodiments may search for optimal performance by running several topology assumptions and optimization algorithms to obtain an optimal multicore topology. The iterative embodiments would provide optimization of the communication functions for the intended multicore hardware together with the application software.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

A programmer with knowledge with respect to the application program inspects, analyses, modifies, and configures the application software using the developer station. Referring again to FIG. 2, in step 10a, the programmer analyses the application to find potential for parallelism and concurrency which includes but is not limited to, the modularity of the application functions, data dependencies between different functions which involves finding data structures shared between the different functions and whether they may cause race conditions that could cause data destruction or program deadlocks, as well as specific performance requirements regarding response times, throughput and power consumption. Profiling is used to find the most compute intensive functions of the application, either with a profiling tool or by using a simulator that provides similar functionality. The relative computational load of the functions is analyzed and becomes part of the criteria for the topology assumptions. In step 10b the programmer partitions the application into functional modules and communication enables the modules (communication primitives are inserted).

```
mcapi_msg_send(endpoint[NODE_1][0], endpoint[NODE_2][0],
(void*) &nCommand[0],
        sizeof(nCommand), mcapi_priority, &mcapi_status);
for(i = 0; i < nCommand[2]; i++)
{
    mcapi_msg_recv(endpoint[NODE_1][0], data_buffer, buffer_size,
            &nReceived_size, &mcapi_status);
    total_received_size += nReceived_size;
}
```

Figure 3:
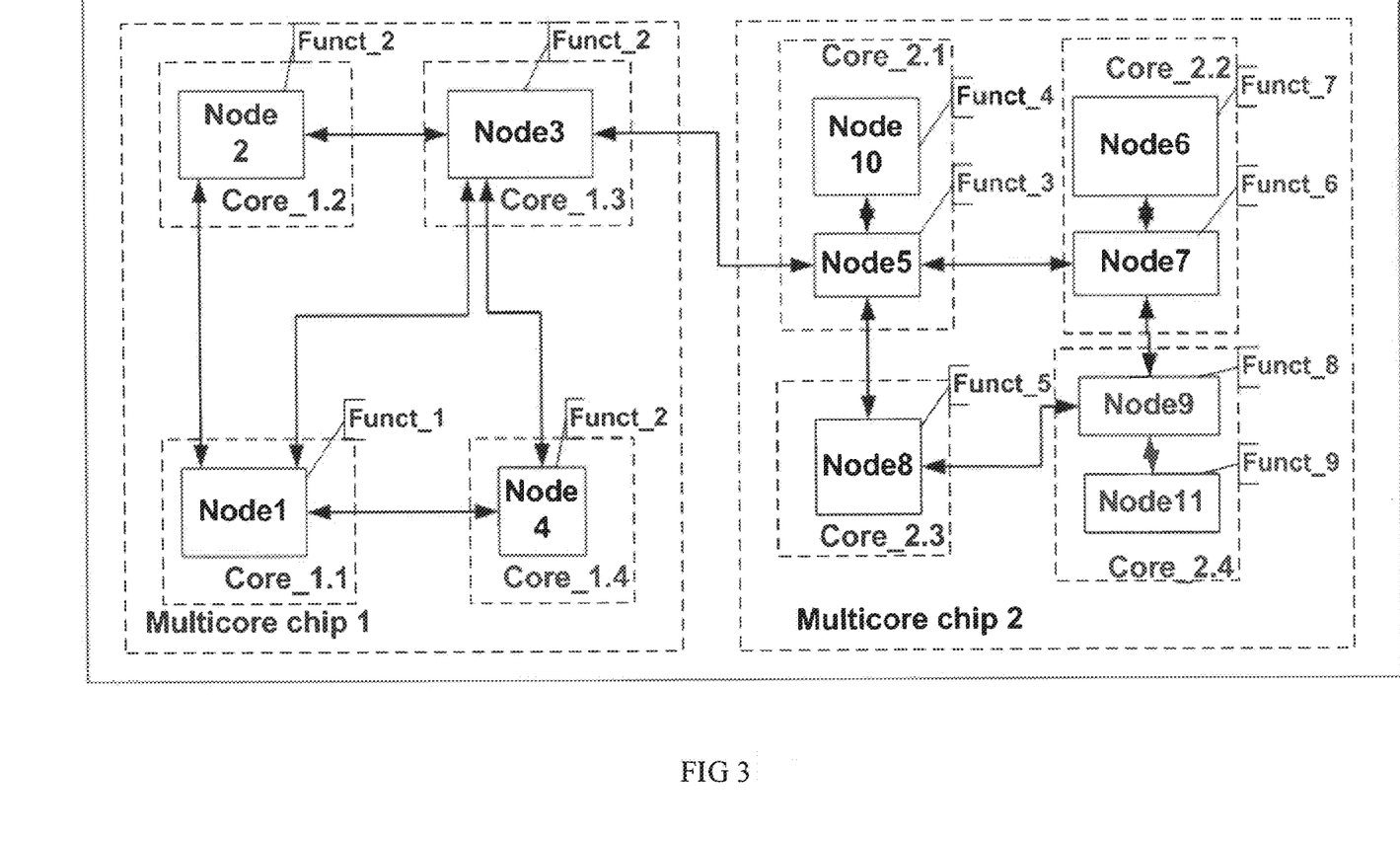
FIG. 3 is a node block diagram of an exemplary interconnect topology in accordance with an exemplary embodiment of the present inventions.

Utilizing the example multicore hardware of FIG. 1, an example application is provided having nine distinct functions, F1-F9 as shown in FIG. 3. The multicore hardware platform of FIG. 1 is shown having two chips 2 with four (homogeneous) cores 4 each. The developer objective is to distribute the application load evenly across the eight cores, for maximum throughput within a given power consumption budget. F1 is a pre-processing function, F2, F3 and F5 are computational functions, F4, F7 and F9 are exception handling functions and F6 and F8 are post processing functions. The relative computational load of the functions is analyzed and the functions or nodes are assigned to cores accordingly.

In block 10, the application functional modules are built using standard development tools into object files. Multiple aspects of the application are analyzed by the application developer. These aspects include but are not limited to, the modularity of the application functions, data dependencies between different functions which involves finding data structures shared between the different functions and whether they may cause race conditions that could cause data destruction or program deadlocks, as well as specific performance requirements regarding response times, throughput or power consumption. Profiling is used to find the most compute intensive functions of the application, either with a profiling tool or by using a simulator that provides similar functionality. In the exemplary embodiment, it is useful to profile the application first and focus on the most compute intensive functions of the application, as they are prime candidates for remapping to other cores. In step 10b-10c the result of the analysis of the application is matched with the hardware architecture, to estimate the optimal mapping of nodes to cores. Of course, the analysis will depend on whether the hardware architecture is fixed or whether is to be defined. The application and hardware is next analyzed and estimated to give the optimal performance with respect to number of nodes, cores, and properties in a static multi-core communications topology. In step 10c the topology requirements are defined and configured based on the application and hardware analysis or reconfigured based on testing and matching to application requirements.

As such, in block 10, based on the application analysis, the application partitioning and the target multicore computer, the programmer estimates how to best map the application and to create and configure the communications topology, the topology assumptions, balancing performance and resource requirements. It is determined that the initial mapping of functions, nodes and cores should be done in accordance with FIG. 3. As shown in FIG. 3, the physical interconnects between the on-chip cores and between the chips are different which needs to be accounted for in creating the topology.

Figure 4:
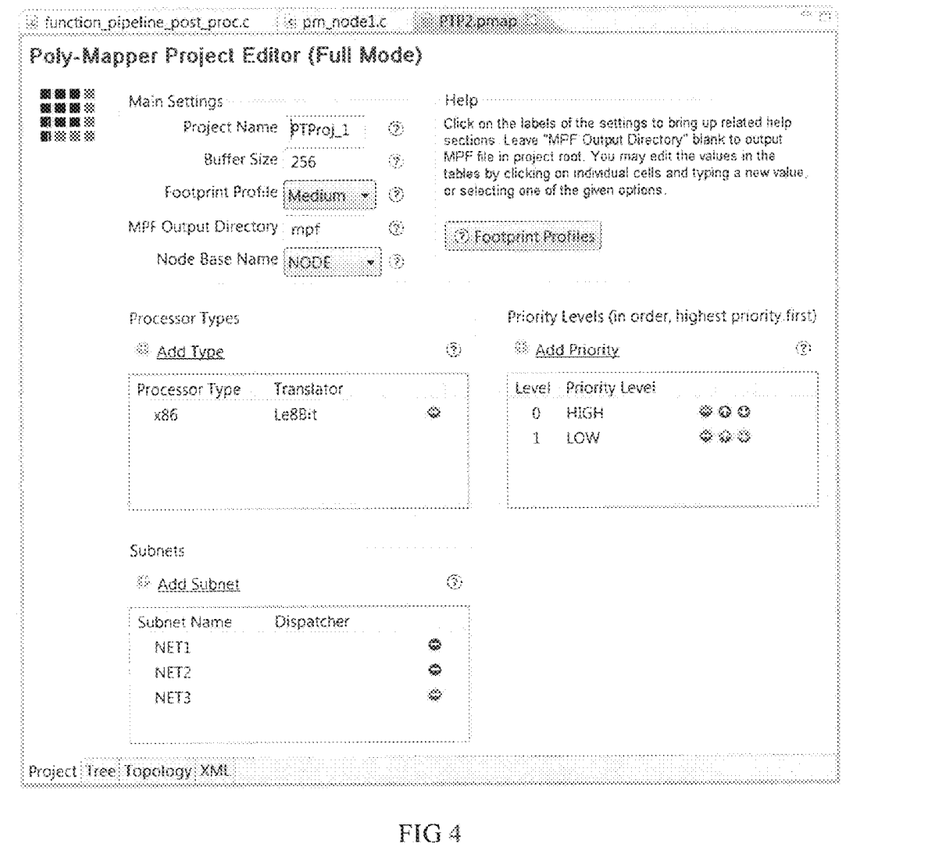
FIG. 4 is an exemplary screen shot of a project editor as presented in a GUI of a developer station in accordance with an exemplary embodiment of the present inventions.
Figure 5:
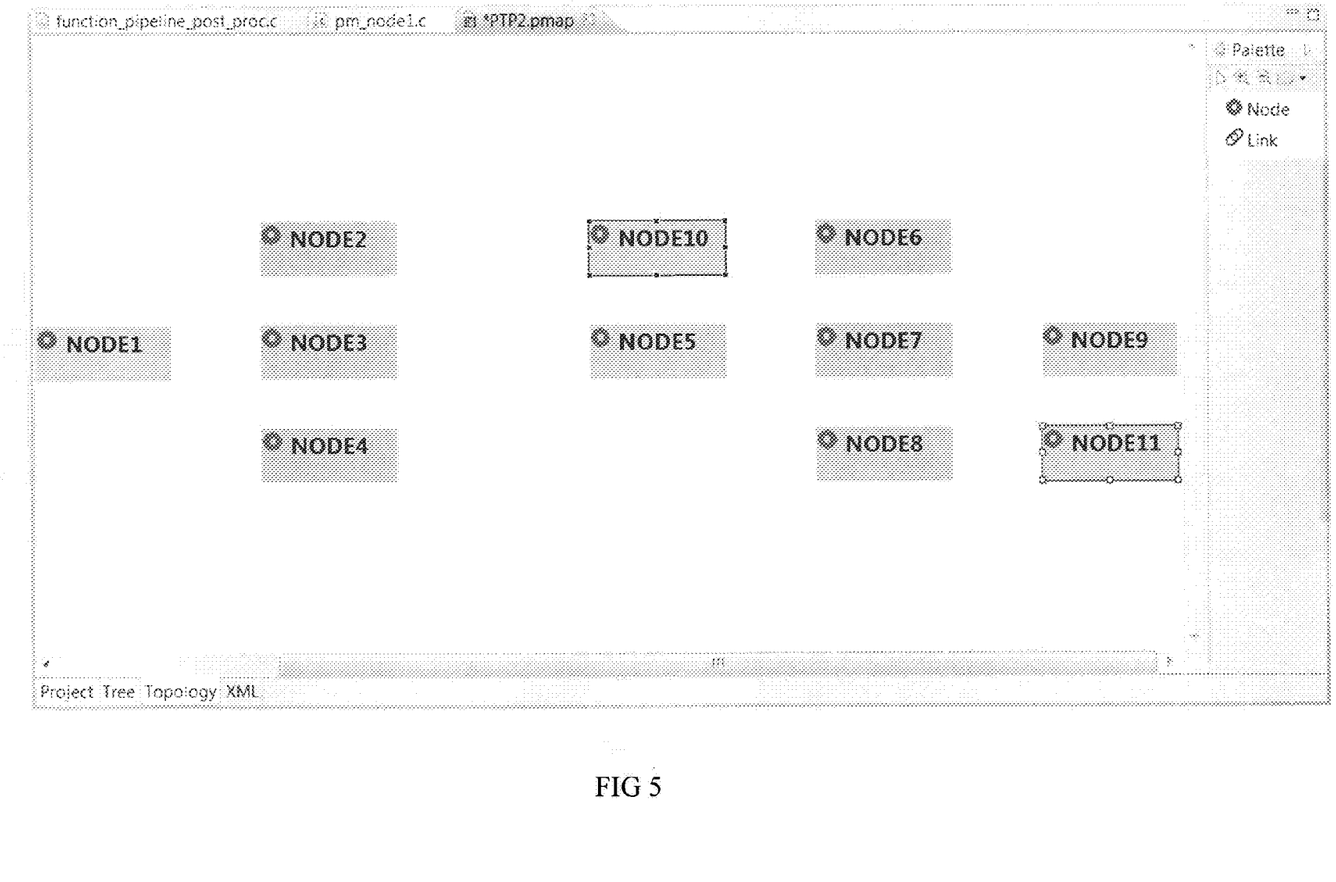
FIG. 5 is an exemplary screen shot of a node topology as presented in a GUI of a developer station in accordance with an exemplary embodiment of the present inventions.
Figure 6:
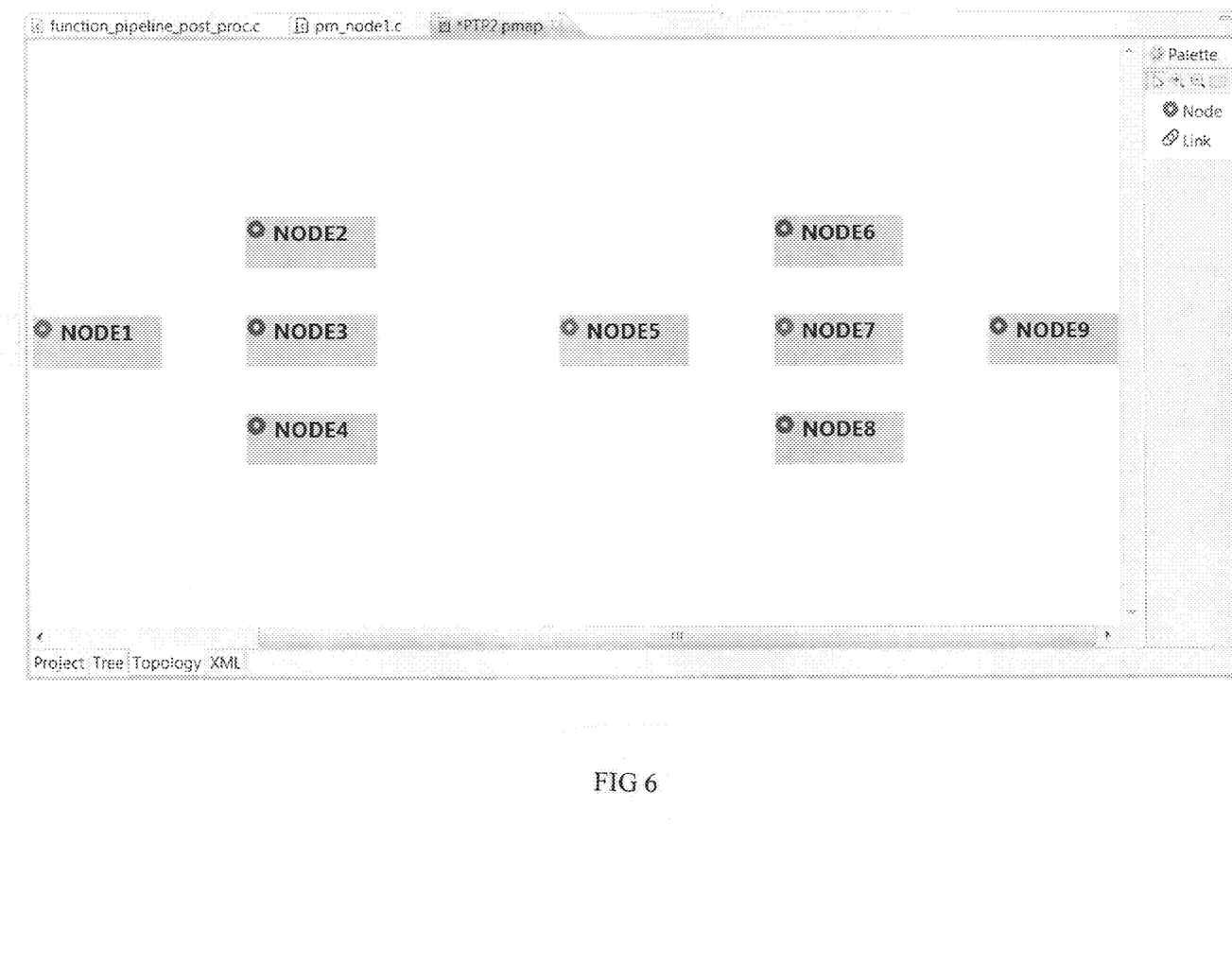
FIG. 6 is an exemplary screen shot showing modifications to the node topology of FIG. 5 as presented in a GUI of a developer station in accordance with an exemplary embodiment of the present inventions.

At step 15a, the topology is created and certain basic properties of the topology are defined as shown in FIG. 4 based upon the topology of FIG. 3. The initial number of nodes is specified at creation time and can later be modified as needed, using drag and drop functionality as shown in FIGS. 5-6. The communications topology is defined and created to accommodate the mapping of the functions to the nodes. The creation of the topology can be done from scratch, by creating a new topology, by importing an existing (XML based) topology template or by using an already existing topology map. The initial parameters and properties including the number of nodes are specified in case of a new topology, through a wizard interface. The number of nodes can also conveniently be modified in the topology canvas in a GUI through drag and drop or copy and paste as shown in FIG. 6. The properties and resources of the nodes, including the type of core, operating system, repositories and pre-allocated data structures are specified in the properties view in a GUI.

Figure 7:
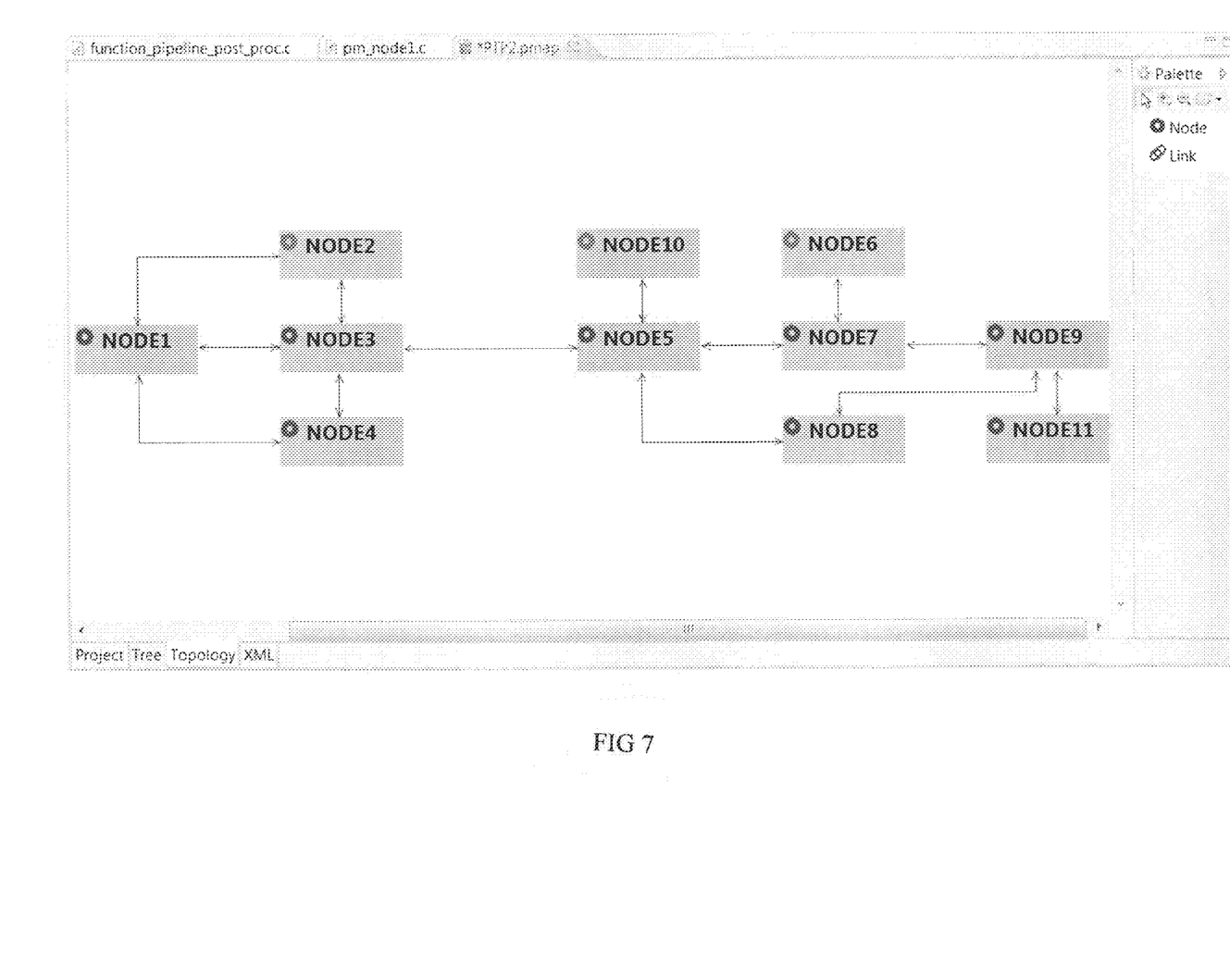
FIG. 7 is an exemplary screen shot of a node resources assignment as presented in a GUI of a developer station in accordance with an exemplary embodiment of the present inventions.
Figure 8:
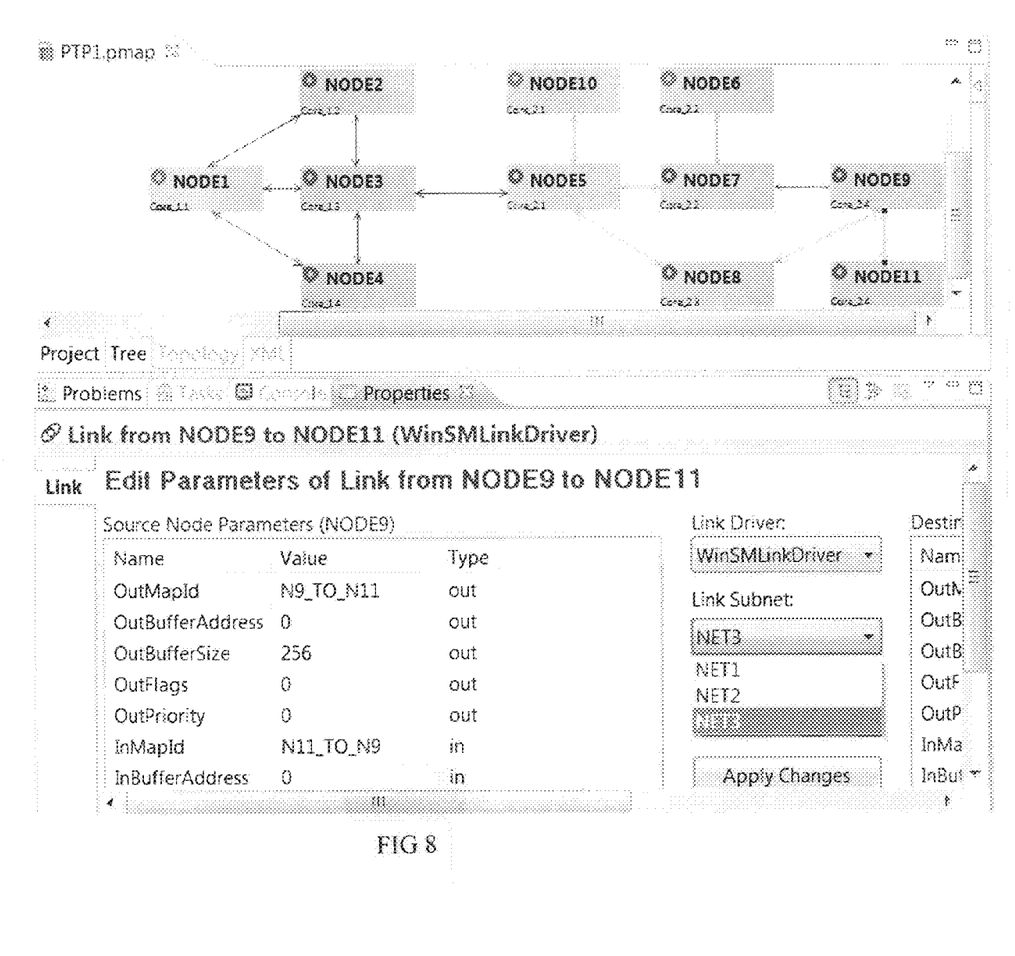
FIG. 8 is an exemplary screen shot of a node link parameter assignment as presented in a GUI of a developer station in accordance with an exemplary embodiment of the present inventions.

Links are added and defined as shown in FIG. 7. In Step 15b node and link resources as well as their binding to the multi-core computer are configured as shown in a step by step procedure of FIG. 7-8. The node resources need to be balanced to be sufficient to meet the performance requirements while staying within the available (memory) resources of the multicore computer. Links are configured: the type of link, direction, subnet, mapping to hardware and resources are defined. The subnets represent the different interconnects as shown in FIG. 8. In block 15, the links between the nodes are created in the topology canvas view. The type, properties, parameters and resources of the links are defined in the properties view. The topology is saved and validated against the topology models and that all values that are user defined are within the allowed minimum and maximum. The validation includes determining that values or names are unique don't have duplicates and that there are all objects or components requiring a value or a name have one. The output from the block 15 is transferred to block 20 into a static Topology-Map defining nodes, links, routing, driver, system software, hardware, and resources. The Topology-Map has then further been validated against the topology model verifying topology, dispatcher, link, parameter and default value models.

Figure 9:
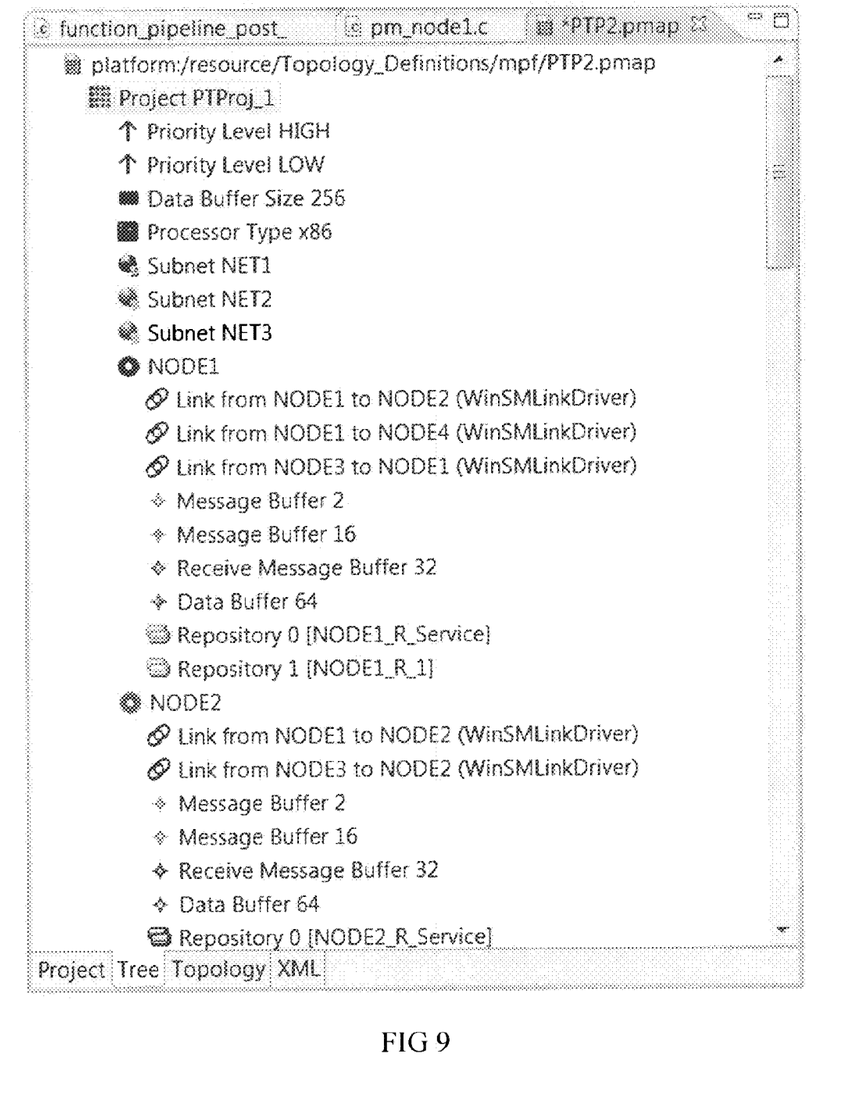
FIG. 9 is an exemplary screen shot a tree-structured topology overview as presented in a GUI of a developer station in accordance with an exemplary embodiment of the present inventions.
Figure 10:
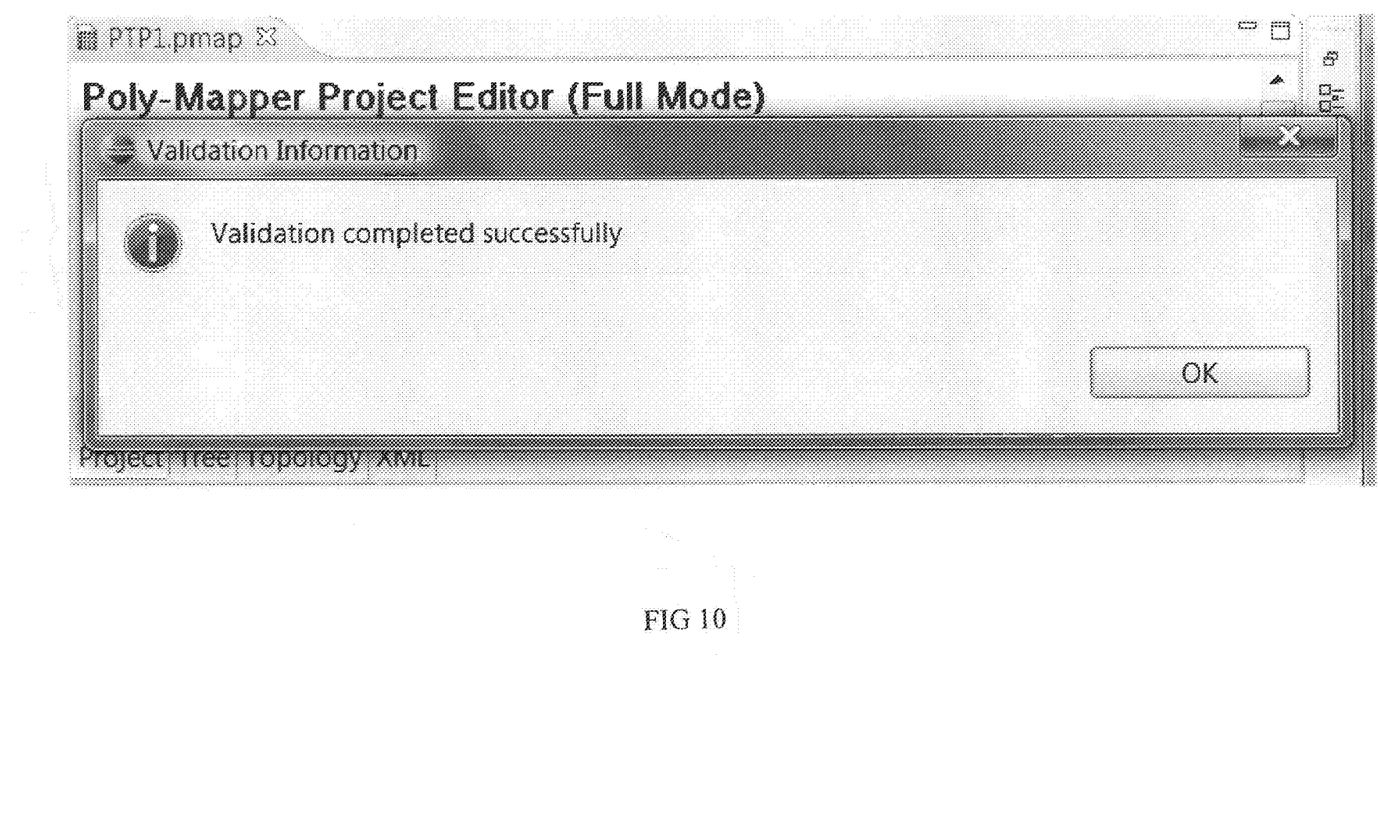
FIG. 10 is an exemplary screen shot of a topology map validation as presented in a GUI of a developer station in accordance with an exemplary embodiment of the present inventions.
Figure 11:
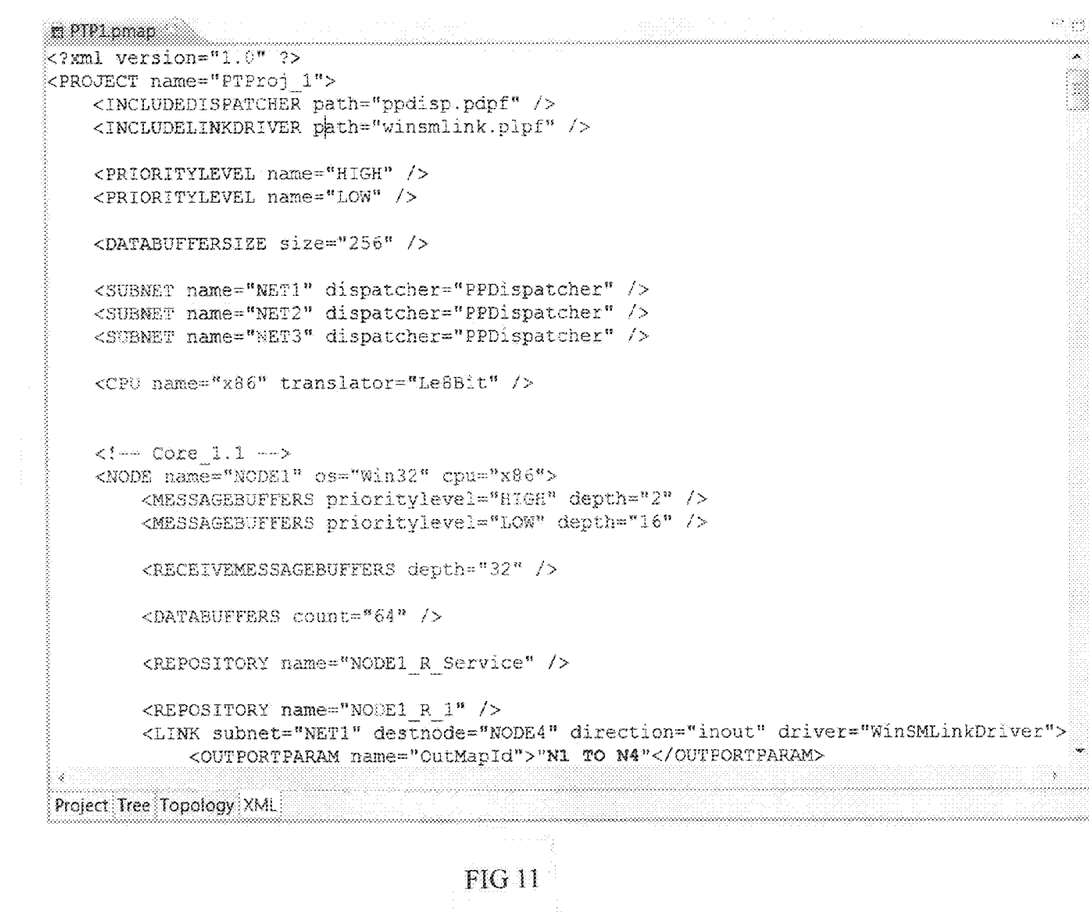
FIG. 11 is an exemplary screen shot of an XML based topology map as presented in a GUI of a developer station in accordance with an exemplary embodiment of the present inventions.

A tree view provides an overview of the topology and associated properties as shown in FIG. 9. In Step 15c the completed Topology-Map is validated and saved and the XML-based Topology-Map is generated as shown in FIG. 10. If the validation is not successful the process goes back to step 15a for corrective action. An exemplary XML-based Topology-Map is shown in FIG. 11.

Figure 12:
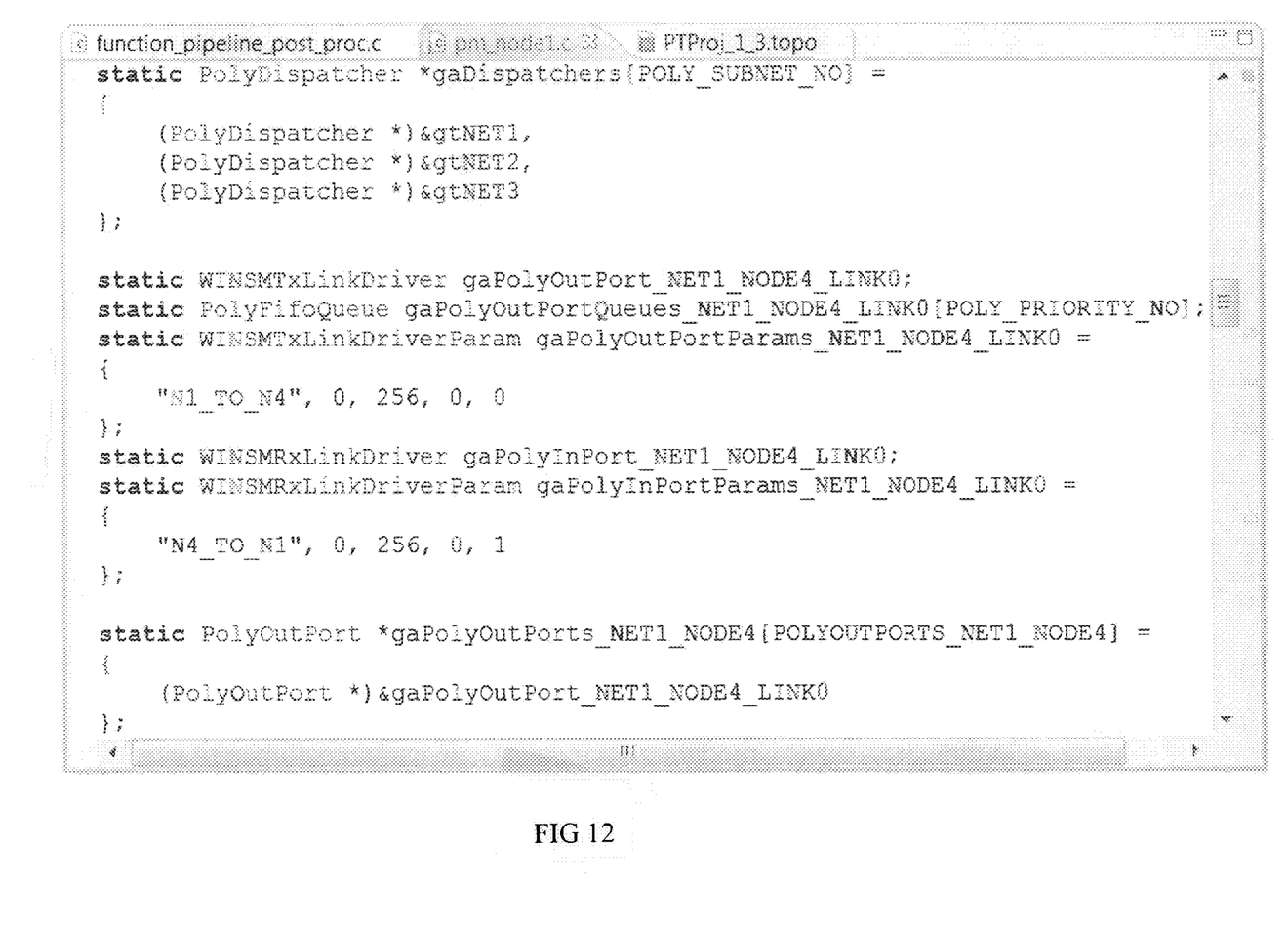
FIG. 12 is an exemplary executable of the C language base topology in accordance with an exemplary embodiment of the present inventions.

In Step 20a, the topology-map is parsed, validated, data structures are created, the shortest path between nodes are calculated, and routing tables created. The Shortest Path Between Nodes (SPBN) is calculated using the Dijkstra's shortest path algorithm. The C-based topology definition is generated, in the exemplary embodiment one set of files for each node as shown in FIG. 12. Using SPBN provides for optimal performance. Routing tables used in the communication between nodes in the MCTG are based on the SPBN that are created at configuration time for optimal and predictable run-time performance. Those skilled in the art will recognize that other SPBN algorithms are equally applicable (e.g., Johnson's algorithm).

In Step 25a the topology definition is built using standard development tools, compiler and assembler. The C-language based optimized topology definition files are generated. One c program (.c) and one header file (.h) is generated for each node in the topology. The .c and .h files contain the definitions, data structures and initialization routines together comprising the topology. In Step 25b the topology is linked, using a standard linker, with the previously built application and the communications run-time library. The application is partitioned into the multiple MCAPI communications enabled functions, to accommodate data transfers and synchronization between the functions residing on different nodes, and the communication methods are based on the application requirements. The application is now ready for testing on the multicore computer.

In step 25a-25b the C-based topology, the partitioned application and the appropriate run-time communications components (from the communications library), as defined in the topology definition are built into executable (binary) files, using the standard development tools (such as compiler, assembler and linker) for the target multi-core computer system. The modules are loaded on the appropriate cores 4 and the resulting application, now running across multiple cores, is again analyzed to determine whether the assumptions made in the initial analysis and mapping of nodes (functions) to cores provides the expected results. The results are matched against the application performance requirements to determine whether satisfactory or not. If so, the topology definition, generation and application integration is completed, if not the developer goes back to application preparation of block 10 to revise the topology requirements. In the topology definition creation the topology is validated against models and the topology-map is optimized using SPBN calculations. The generated model based topology components has further been created and validated. The validated components are static routing table, static (pre-allocated) data structures and predefined initialization routines.

In step 230 inside the Optimized Topology for Multi-core Application the final approved and validated topology is ready for use together with the intended application software on the intended multi-core computer hardware.

In Step 30a the application is debugged for correctness and performance, using standard debugging tools. In Step 30b the application is validated against application requirements. Notable requirements could be data throughput, application response times and power consumption. In most cases the end result does not match the initial assumptions, and modifications in the topology assumptions will be required and the process repeated to achieve desired results. It is for example difficult to predict how the communication between the now distributed function modules, will impact the overall application performance. It could be that the communication between the two chips in our example turns out to be a bottleneck, and nodes would have to be remapped or node or link resources modified, based on new analysis. It is also possible that performance can be improved by modifying the data exchange between the application modules.

The above described methodology can be alternatively applied to migration of single processor applications to multi-core computers, by dividing the application functions, inserting MCAPI communications primitives, creating a topology and mapping the functions to the different cores. The application can be optimized by reconfiguring the topology by adding more nodes, modifying the topology resources and by matching the topology properties and the application behavior. MCTG speeds up this process substantially, allowing many optimization iterations, reducing development time and improving the end result.

Obviously, readily discernible modifications and variations of the described inventions are possible in light of the above teachings. It is therefore to be understood that within the scope of the appended claims, the invention may be practiced otherwise than as specifically described herein. For example, the topology modeling could also be implemented by structured, portable languages other than XML, and standards communications APIs other than MCAPI. Likewise, the topology generation methodology may be embodied on a physical storage medium for distribution to developers. Such mediums include CD-ROM, DVD, semiconductor memory, or a network accessible storage for download.

Thus, the foregoing discussion discloses and describes exemplary embodiments of the present invention only. Accordingly, the disclosure of the present inventions is intended to be illustrative, but not limiting with respect to scope. The disclosure, including any readily discernible variants of the teachings herein, define, in part, the scope of the attached claim terminology.

We claim:

1. A computer-implemented method for generating a multi-core communication topology corresponding to a predetermined number of cores of a multi-core computer with an application programming device, comprising:

receiving, at a time of creating a multi-core communication topology map, via a graphical user interface (GUI), a description of a number of nodes for mapping to the predetermined number of cores of the multi-core communication topology, each node included in the number of nodes corresponding to one or more functions of a specific application;

specifying, via the GUI, properties of each of the number of nodes;

specifying, via the GUI, communication links between each of the nodes of the multi-core communication topology using a dedicated multi-core communication library of an electronic memory of the application programming device; and processing the multi-core communication topology map to generate a multi-core communication capable executable application program interface (API) that enables the execution of the specific application on the multi-core computer, wherein the multi-core communication topology map is separate from run-time communication in the specific application to make the multi-core communication topology map modifiable, at configuration time, to change at least one communication path between at least two nodes in the multi-core communication topology map independent of a corresponding modification of application source code associated with the specific application.

2. The computer-implemented method according to claim 1, wherein the API is validated and generated using an extensible markup language code.

3. The computer-implemented method according to claim 2, wherein the extensible markup language code is generated in coordination with entries provided to the GUI.

4. The computer-implemented method according to claim 1, wherein the communication library supports a Multi-core Communications API as a means to access the multicore communication topology.

5. The computer-implemented method according to claim 3, wherein the GUI for the configuration time includes different view modes selectable in any sequence.

6. The computer-implemented method according to claim 1, wherein the API is generated continuously and modified, or created separately and inserted as an intermediate step of a configuration sequence at the time of creating the multi-core communication topology map.

7. The computer-implemented method according to claim 1, wherein the generated API utilizes a topology having a shortest path between each node in the topology.

8. The computer-implemented method according to claim 1, wherein communication between nodes is synchronous, asynchronous, connected, connectionless, buffered, scalar, packets, or a stream communication.

9. The computer-implemented method according to claim 1, where a validated output file for the multi-core topology is generated at the application programming device.

10. The computer-implemented method according to claim 1, wherein modifying the multi-core communication topology results in a new mapping to the predetermined number of available cores.

11. The computer-implemented method according to claim 1, wherein the configuration time is before run-time and after developing source code corresponding to the specific application.

12. A non-transitory computer readable storage medium encoded with computer program instructions executable by a cooperatively functioning application development computer to cause the computer to execute a method in accordance with the computer program instructions to generate a multi-core communication topology corresponding to a predetermined number of cores of a multi-core computer, the method comprising:

identifying, at a time of creating a multi-core communication topology map, via a graphical user interface (GUI), a number of nodes for mapping to the predetermined number of cores of the multi-core communication topology, each node included in the number of nodes corresponding to one or more functions of a specific application;

specifying, via the GUI, properties of each of the number of nodes;

specifying, via the GUI, communication links between each of the nodes of the multi-core communication topology using a dedicated multi-core communication library; and processing the multi-core topology to generate a multi-core communication capable executable application program interface (API) that enables the execution of the specific application on the multi-core computer, wherein the multi-core communication topology map is separate from run-time communication in the specific application to make the multi-core communication topology map modifiable, at configuration time, to change at least one communication path between at least two nodes in the multi-core communication topology map independent of a corresponding modification of application source code associated with the specific application.

13. The non-transitory computer readable storage medium according to claim 12, wherein the API is validated and generated using an extensible markup language code.

14. The non-transitory computer readable storage medium according to claim 13, wherein the extensible markup language code is generated in coordination with entries provided to the GUI entry of the application development computer.

15. The non-transitory computer readable storage medium method according to claim 12, wherein the communication library supports a Multi-core Communications API as a means to access the underlying multicore communications topology.

16. The non-transitory computer readable storage medium according to claim 14, wherein the GUI for the configuration time includes different view modes selectable in any sequence.

17. The non-transitory computer readable storage medium according to claim 12, wherein the API is generated continuously and modified, or created separately and inserted as an intermediate step of a configuration sequence at the time of creating the multi-core communication topology map.

18. The non-transitory computer readable storage medium according to claim 12, wherein the generated API utilizes a topology having a shortest path between each node in the topology.

19. The non-transitory computer readable storage medium according to claim 12, wherein communication between nodes is synchronous, asynchronous, connected, connectionless, buffered, scalar, packets, or a stream communication.

20. The non-transitory computer readable storage medium according to claim 12, includes instructions further comprising:
    generating a validated output file for the multi-core topology.

21. The non-transitory computer readable storage medium according to claim 12, wherein modifying the multi-core communication topology results in a new mapping to the predetermined number of available cores.

22. The non-transitory computer readable storage medium according to claim 12, wherein the configuration time is before run-time and after developing source code corresponding to the specific application.

\* \* \* \* \*